United States Patent [19]

Davis et al.

[11] Patent Number: 5,055,839
[45] Date of Patent: Oct. 8, 1991

[54] BREAKAWAY KEYBOARD

[75] Inventors: John C. Davis, Lake Worth; John C. Irwin, Boca Raton, both of Fla.

[73] Assignee: International Business Machines Corporation, Armonk, N.Y.

[21] Appl. No.: 451,479

[22] Filed: Dec. 15, 1989

[51] Int. Cl.⁵ .......................................... H03K 17/94
[52] U.S. Cl. ...................................... 341/22; 74/527; 400/682
[58] Field of Search ............... 108/6; 248/454, 456; 16/343, 344; 312/208, 27, 24; 400/682; 340/711; 341/22; 74/527, 568 R, 568 FS

[56] References Cited

U.S. PATENT DOCUMENTS

| | | |
|---|---|---|
| 1,253,641 | 1/1918 | Steele . |
| 3,254,452 | 6/1966 | Costantini et al. ............... 49/386 |
| 3,830,352 | 8/1974 | Kolpek ............................... 400/682 |
| 3,902,034 | 8/1975 | Isozaki ........................... 400/682 X |
| 4,421,035 | 12/1983 | Gubbe et al. ........................ 108/6 |
| 4,496,200 | 1/1985 | Hagstrom et al. ................. 312/208 |
| 4,576,578 | 3/1986 | Parker et al. ................... 400/682 X |
| 4,693,444 | 9/1987 | Williams et al. ............... 400/682 X |
| 4,718,740 | 1/1988 | Cox ..................................... 312/208 |
| 4,735,394 | 4/1988 | Facco ............................ 400/682 X |
| 4,815,164 | 3/1989 | Rottinghaus ........................ 16/296 |
| 4,833,755 | 5/1989 | Bonin .................................. 16/344 |

Primary Examiner—Ulysses Weldon
Attorney, Agent, or Firm—John C. Smith

[57] ABSTRACT

A system which is physically oriented in a vertical plane, is attached to a wall, and has a hinged keyboard. The keyboard is attached to the system solely by a hinge which has at least three positions. The hinge has a closed position to minimize space when the system is not used, an open position during normal use, and a breakway position to release the keyboard when excessive pressure is applied. The breakway keyboard eliminates damage caused by excessive pressure placed on the keyboard due to a person leaning on the board.

7 Claims, 4 Drawing Sheets

BREAKAWAY KEYBOARD

BACKGROUND OF THE INVENTION

1. Technical Field

This invention relates to information handling systems. In particular, information handling systems with minimum space requirements and having integral protection for the mechanical keyboard structure.

2. Background Art

For ease of illustration, the term system will hereinafter be used to refer to the general category of information handling systems which includes computers, micro-computers, personal computers, data entry terminals, intelligent workstations, and the like. Further, the term keyboard, as used in this specification, is broadly defined to include data entry devices such as traditional typewriter-like keyboard devices, special purpose key pads, and magnetic and optical tablets. As systems were developed, they were typically used in an office or home environment. Due to that environment, the basic physical configuration of systems usually was configured as a table top system unit, a display, and a keyboard. The system unit was generally configured to contain the processor, storage, and related circuitry, including electronic adapter cards. The display was usually a video display device. The keyboard was generally similar to a common typewriter keyboard. A basic system, as described above, is well known in the art.

Numerous minor variations to the basic system are known. For example, system units have been integrated with keyboards and/or displays. In addition, other peripheral devices have been developed for attachment to systems such as printers, plotters, pointing devices, and the like. However, these configurations all tended to have a common feature in that they were physically configured for a table top environment. In addition, the keyboards were usually designed to be placed on a firm support, such as a table or desk top.

More recent developments have led to smaller, more portable devices, such as laptop computers. Laptop computers are generally smaller and more mobile. However, the keyboards used with these machines are generally an integral part of the system unit and would use the same physical support that the system unit used during operation.

Another variation in the development of systems was the development of tower computers. Tower computers are systems which are orientated in a vertical plane. They generally are placed on the floor. This results in minimal floor space, but creates placement problems. The placement problems are due to placement of the tower on the floor. When placed on a floor, the system may go unnoticed. Therefore, careless placement may result in an individual tripping over the machine, thus resulting in injury to the individual and damage to the machine.

A special area of use for systems is in non-traditional environments, such as industrial plants and hospitals. In such a setting, there often is a limited amount of physical space to place the system. Desk top or table space is often unavailable in manufacturing or hospital environments. This prevents the convenient placement of the system unit. In addition, the keyboard could not be placed in a convenient location for use.

A second problem existed as a result of the difficulty of physically locating systems in these environments. Without the relatively secure location of a desk or table top, accidental damage to the components was more likely.

Due to the problems caused by the lack of convenient work locations in these environments, the introduction and use of systems has not been as effective as possible. This is particularly true in the hospital environment.

The hospital environment has special concerns, over and above those found in a typical industrial environment. In particular, the use of systems in a patient's room raises special problems. First, the patients may have no familiarity with systems. This may manifest itself as careless handling of components by curious patients. If the systems were located in the hospital room in an insecure manner, the possibility of damage due to mishandling is considerable. Mishandling can take the form of active manipulation or of inadvertent damage from accidentally leaning on the keyboard with excessive force. Second, accidental damage due to patients inadvertently knocking unsecured components to the floor may result. Third, the patient's illness may result in damage to the system caused by involuntary acts by the patient due to illness. Fourth, the hospital staff may damage the system components even though they are trained and knowledgeable in the area of systems. This is due to the peculiar nature of the hospital environment. In the hospital environment, changes in a patients condition may necessitate rapid action by hospital staff. In that type of situation, unsecured equipment in a patient's room may be handled in a harsh manner to allow the hospital staff to move quickly to attend the patient. Equipment with a traditional physical configuration, as described above, may add to the problem due to the space requirements of the equipment.

Additional problems arise with certain machines, such as tower computers. A machine located on the floor, such as a tower computer, may result in injury to hospital personnel in a crisis situation if the machine is in an inappropriate location and the hospital personnel do not notice it.

As a result of the numerous problems related to placing highly technical and delicate equipment, such as unsecured systems of the traditional physical configuration, in a non-traditional physical environment, the use of systems in these environments has been inhibited. This has been particularly true in the area of hospitals.

SUMMARY OF THE INVENTION

It is an object of this invention to minimize the floor space requirements of systems.

It is another object of this invention to reduce damage to systems caused by excessive force on keyboards.

The foregoing and other objects are accomplished by a system which is physically oriented in a vertical plane, is attached to a wall, and has a hinged keyboard. The keyboard is supported solely by the hinge, and does not require an underlying surface in its operating mode. The keyboard is attached to the system by the hinge which has at least three positions. The hinge has a closed position to minimize space when the system is not used, an open position during normal use, and a breakaway position to release the keyboard when excessive pressure is applied.

DESCRIPTION OF THE PREFERRED EMBODIMENT

Figure 1:
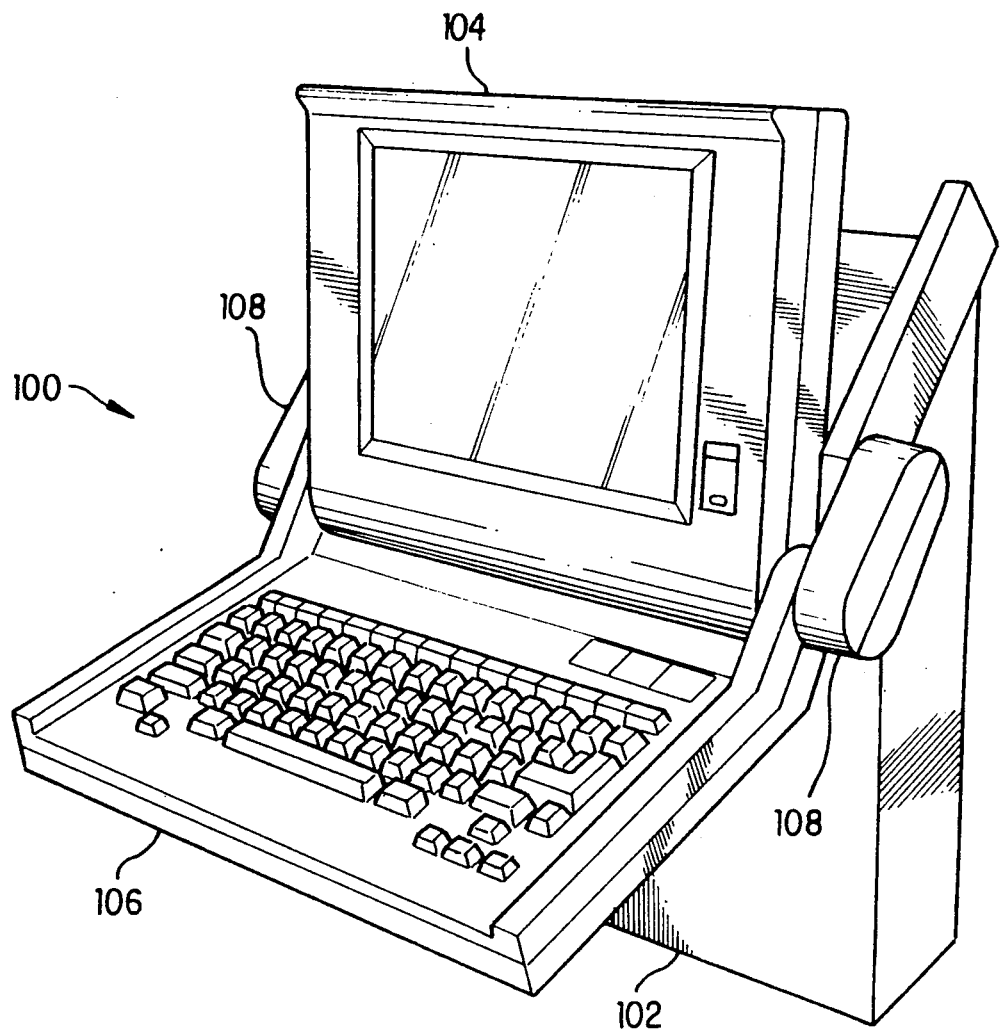
FIG. 1 shown an embodiment of the invention in the normal open position.

In FIG. 1, an embodiment of the invention is shown as it appears in the operating position. The system unit 102 is orientated in a vertical plane. This allows the unit to be attached to a firm object, such as a wall. In addition, the vertical orientation results in minimal use of floor space. A display 104 is shown in the preferred embodiment, but is not required for the purposes of this invention. The keyboard 106 is attached to the system unit 102 by hinge supports 108. Hinge support 108 contains the detent mechanism (shown below in the discussion of FIG. 2) which holds the keyboard 106 in the closed, operating, and breakaway position. By detenting the keyboard 106 in the operating position, the user can enter data in a comfortable and familiar position.

In the closed position (not shown), the keyboard 106 is tilted upward until it reaches a substantially vertical position to minimize space. In the preferred embodiment, the keyboard 106 covers the front of the display 104. However, for the purposes of the invention, it is only important that in the closed position, the system 100 occupies minimum space during periods of non-use.

If excessive force is applied to the keyboard 106, such as when a person leans on it, the keyboard 106 will enter the breakaway position. In the breakaway position (not shown), the keyboard 106 will tilt downward until the keyboard 106 is orientated in a substantially vertical direction. The hinge support 108 will not release the keyboard 106 from the operating position to the breakaway position until the pressure on the keyboard 106 exceeds that which would be applied to the keyboard 06 under normal use. In the preferred embodiment, a weight of approximately 4.5 Kilograms is used. However, the exact amount of weight used to move the keyboard 106 from the operating position to the breakaway position is a non-critical design choice and may vary due to material strength, etc.

When excessive force is applied to the keyboard 106, damage to the keyboard 106 or hinge supports 108 is avoided by allowing the keyboard 106 to drop to the breakaway position, thereby releasing the pressure on those components of the system.

Figure 2:
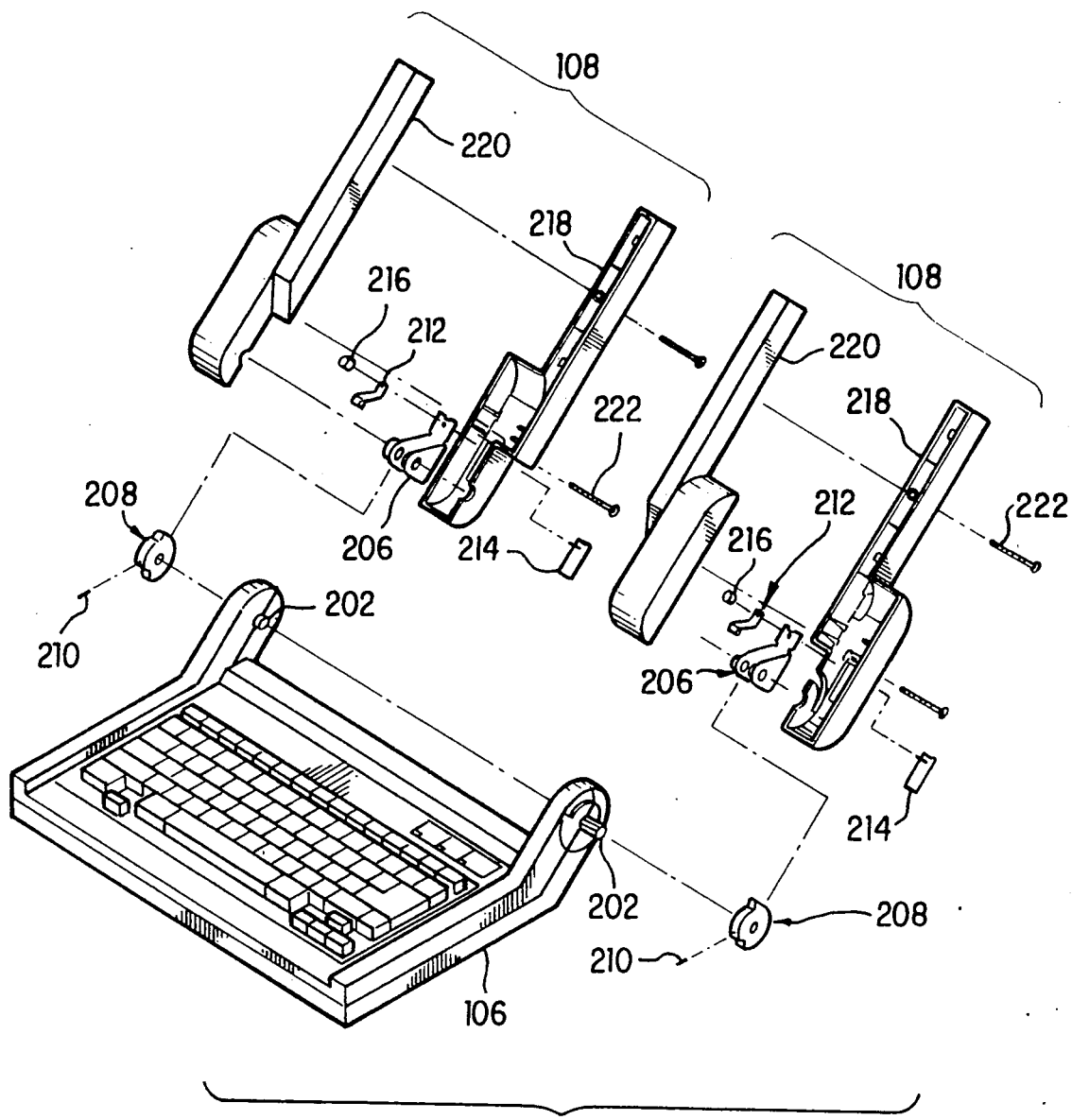
FIG. 2 shows a detailed description of the keyboard and hinge assembly.

FIG. 2 illustrates the hinge support 108 mechanism used in the preferred embodiment. It should be noted that many types of hinge mechanisms are known in the art and many may be used to implement the invention. The particular mechanism used is not critical invention. The keyboard 106 contains bushings 202. Bushings 202 are fed through support baskets 206 and cams 208. Cams 208 are attached to bushings 202 and the lower hinge supports 218 with brackets 214 and nuts 216. Lower hinge supports 218 are attached to upper hinge supports 220 with screws 222. Cams 208, support baskets 206, and springs 212 are enclosed by lower hinge supports 218 and upper hinge supports 220.

Figure 3:
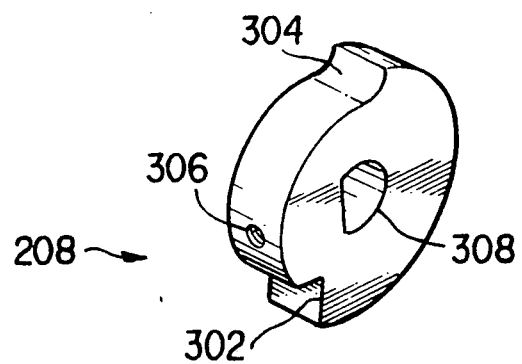
FIG. 3 shows an enlarged view of the cam in FIG. 2.

FIG. 3 illustrates cam 208. Aperture 306 is threaded to hold set screw 210 (shown in FIG. 2). Bushings 202 (shown in FIG. 2) are fed through aperture 308. V-shaped lobe 302 of cam 208 acts as a stop for springs 212 when the keyboard 106 is placed in the closed position. When the keyboard 106 is rotated to the operating position, the spring 212 rests in the cusp shaped lobe 304 of the cam 208. When excessive force is applied to the keyboard 106, the spring will ride out of the cusp shaped lobe 304 allowing the keyboard 106 to drop to the breakaway (vertically downward) position.

Figure 4:
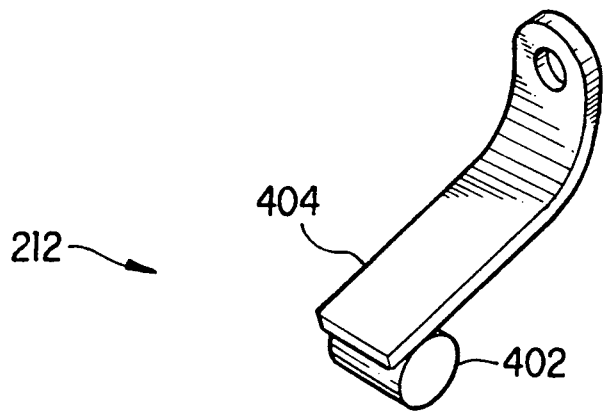
FIG. 4 shows an enlarged view of the spring in FIG. 2.
Figure 5A:
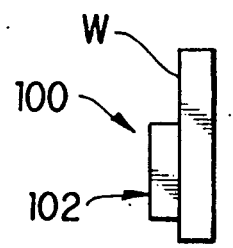
FIGS. 5A–5C show views of the system and system unit attached to a wall, FIG. 5A, (W), a movable wall bracket, FIG. 5B, (MWB) and a cart, FIG. 5C, (C).
Figure 5B:
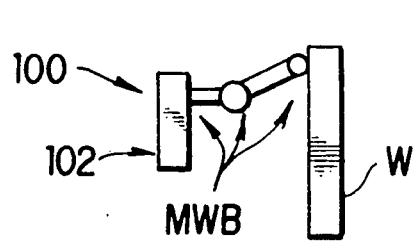
Figure 5C:
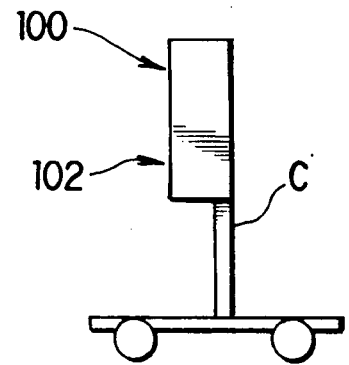

FIG. 4 illustrates an embodiment of the springs 212 which engage the cams 208. Spring contact 402 provides pressure contact with the cam 208 (shown in FIG. 2). Pressure is provided by spring leaf 404. This type of spring loaded cam contact is well known in the art.

While the invention has been described with respect to a preferred embodiment thereof, it will be understood by those skilled in the art that various changes in detail may be made therein without departing from the spirit, scope, and teaching of the invention. For example, many variations to the hinge can be made, such as replacing the cam mechanism in the preferred embodiment with a friction device, a ratchet device, a magnetic device, etc. In addition, the system unit can also be attached to a movable bracket on the wall, to a cart to facilitate movement from one room to another, or even attached to the end of the patient's bed. Further, a system could be designed without a display to suit a particular purpose. Accordingly, the invention herein disclosed is to be limited only as specified in the following claims.

We claim:

1. A system, said system comprising:
    a system unit, said system unit oriented in a vertical plane;
    a keyboard;
    a hinge movably attaching said keyboard to said system unit, said hinge including means for holding said keyboard in at least three distinct positions including a closed position, an operating position, and a substantially vertical downward breakaway position, said holding means having means for detecting when an excessive downward force is applied to said keyboard and further having means for enabling said keyboard, without damaging said hinge, to drop to said breakaway position when said excessive downward force is detected and to be returned to said operating position directly from said breakaway position.

2. A system, as in claim 1, wherein said system unit is attached to a wall.

3. A system, as in claim 2, wherein said system unit further comprises a display vertically integrated into said system unit.

4. A system, as in claim 1, wherein said system unit is attached to a movable wall bracket.

5. A system, as in claim 4, wherein said system unit further comprises a display vertically integrated into said system unit.

6. A system, as in claim 1, wherein said system unit is mounted on a movable cart.

7. A system, as in claim 6, wherein said system unit further comprises a display vertically integrated into said system unit.

* * * * *